Figure 1:
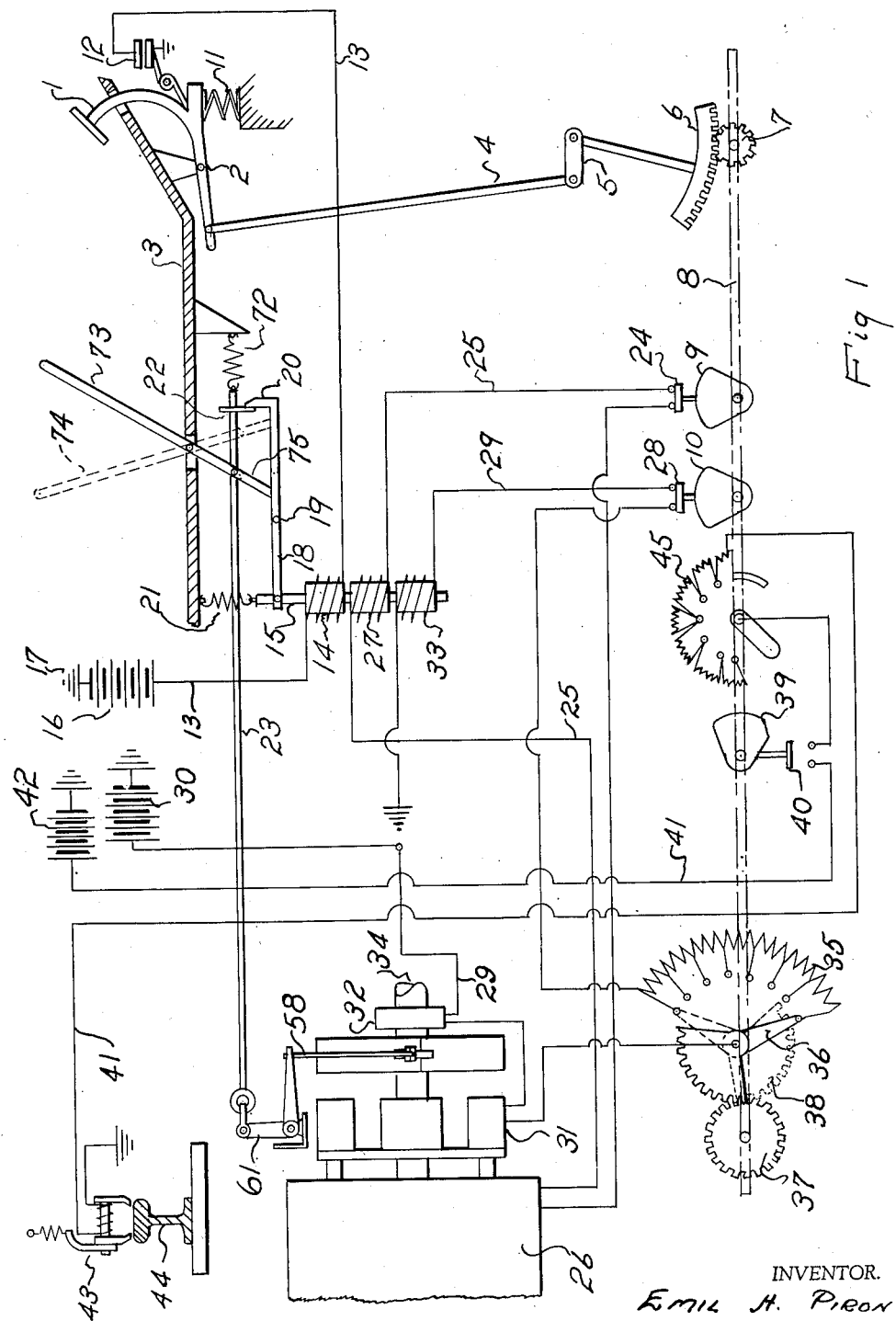

Feb. 6, 1945. E. H. PIRON 2,368,726
RAILWAY BRAKING SYSTEM
Filed Oct. 1, 1941 3 Sheets-Sheet 1

INVENTOR.
Emil H. Piron
BY

Feb. 6, 1945. E. H. PIRON 2,368,726
RAILWAY BRAKING SYSTEM
Filed Oct. 1, 1941 3 Sheets-Sheet 2
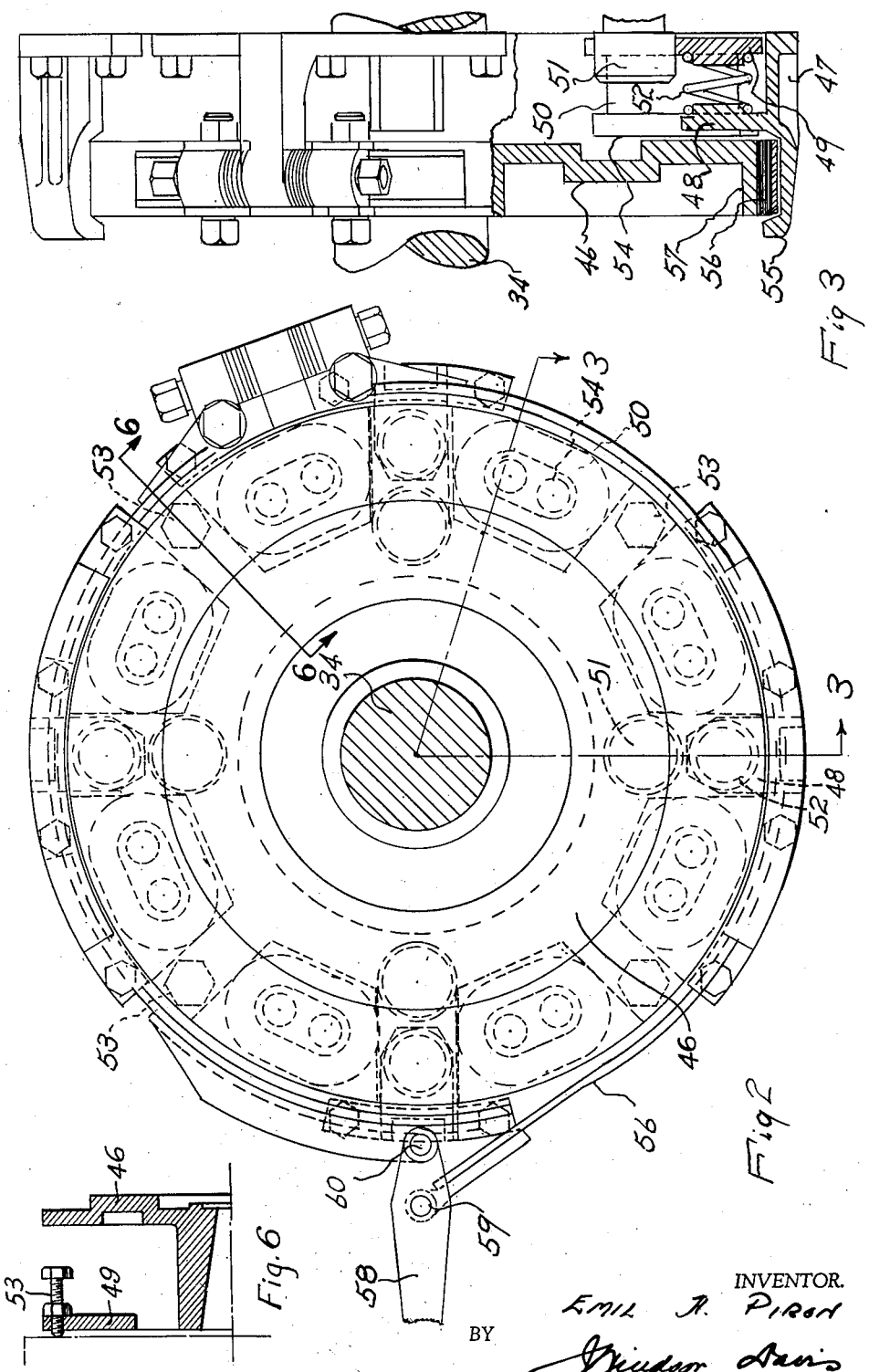
INVENTOR.
Emil R. Piron Feb. 6, 1945. E. H. PIRON 2,368,726
RAILWAY BRAKING SYSTEM
Filed Oct. 1, 1941 3 Sheets-Sheet 3
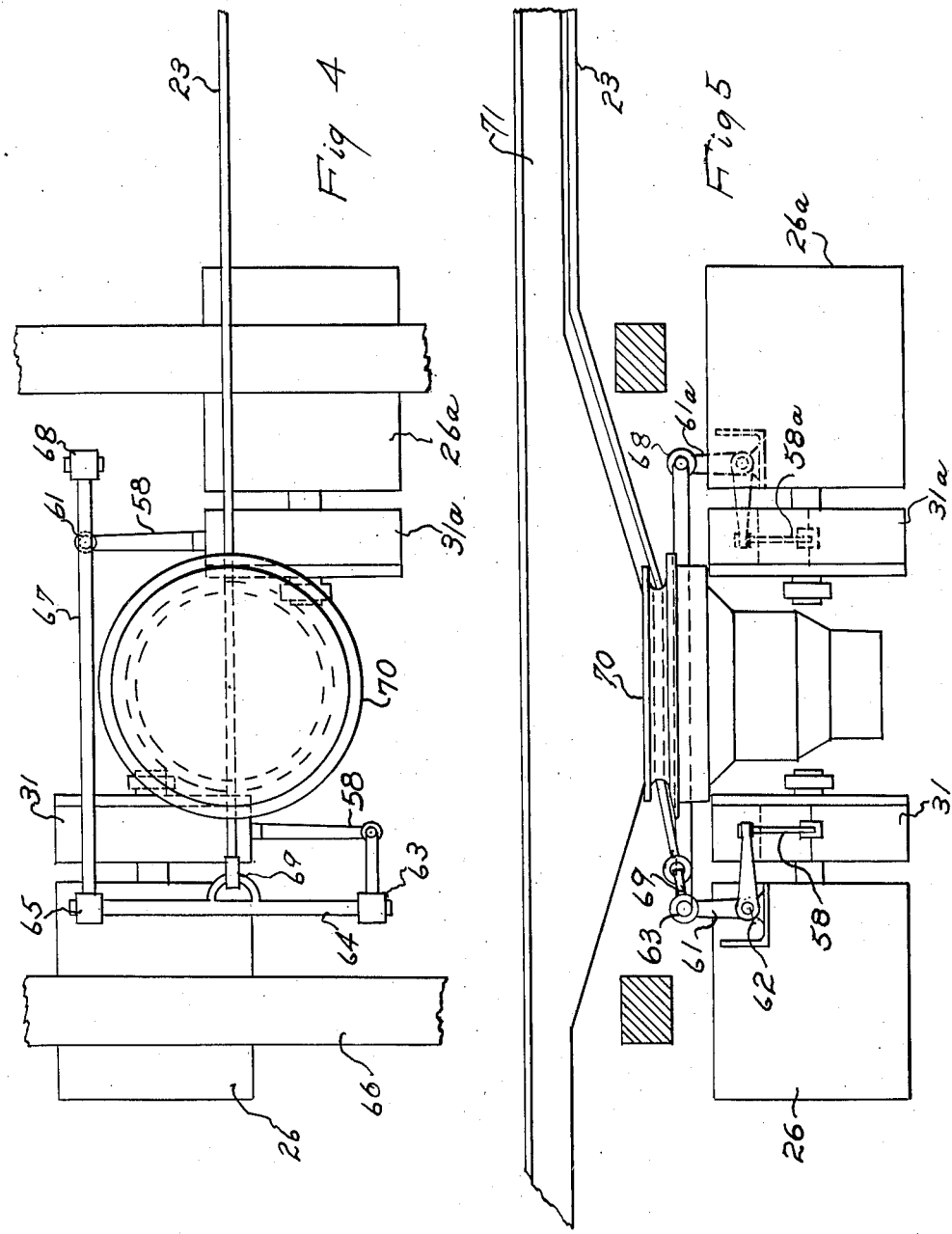
INVENTOR.
Emil H. Piron
BY Patented Feb. 6, 1945

2,368,726

UNITED STATES PATENT OFFICE 2,368,726

RAILWAY BRAKING SYSTEM

Emil H. Piron, New York, N. Y., assignor to Transit Research Corporation, New York, N. Y., a corporation of New York Application October 1, 1941, Serial No. 413,085

13 Claims. (Cl. 188—2)

This invention relates to braking systems for rail cars and has for its object to provide a multiplicity of separate braking means arranged to operate in a predetermined sequence to give smooth, effective and safe braking operations.

Another object is to provide a plurality of brakes arranged to operate in a given sequence during normal operation, which can be made to alter their sequence under emergency conditions and which will automatically alter their sequence in case of failure of either of the first two brakes in the sequence.

A further object is to provide a combination of electrical brakes and friction brakes in which one friction brake will begin braking operation with the fading of the electrical brakes when such fading is caused by lowering of speed and in which an emergency brake operable both manually and automatically stands ready for use at any time, the first friction brake being a service brake used only at speeds of seven miles per hour or below in the preferred sequence while the second friction brake is normally used only to hold the car while standing. The latter brake also functions at any time to replace the electrical and the first friction brake when any one happens to fail.

One braking system of this general type now used on a large number of street cars employs a dynamic brake which is the electrical brake and which is the first in the sequence. When the motorman calls for more braking by depressing the brake pedal the intensity of the action of dynamic brake increases until a point above its maximum capacity is reached whereupon magnetic track brakes come into action. A friction brake is kept locked out of action at speeds above five miles per hour unless the dynamic brake fails. The friction brake is capable of automatic and manual operation. It must be able to assume all car braking functions and it must, therefore, be large and costly even though its total capacity may never be called for.

An object of this invention is to replace the bulky friction brakes with a friction brake preferably in the form of a light magnetic disc brake suitable for functioning at speeds below five to seven miles per hour as the dynamic brake fades, and to provide a separate hand brake capable of serving emergency functions when the dynamic or the disc brake or both fail.

Another object is to provide a hand brake operable at the will of the motorman and, by reason of a spring loaded construction as will be hereinafter explained, also capable of automatic function in case of accidental failure of the dynamic or the disc brake or both. These brakes operate under the control of a series of holding devices which control a lockout, the pedal holding device being "on" when the brake pedal is released and "off" when it is depressed, the dynamic brake holding device being "on" when the dynamic brake is in action and "off" when it fades or fails, and the disc brake holding device being "on" when the disc brake is in action and "off" when it is not operating. Once the pedal is depressed, the loaded spring is unlocked and ready for action subject to the release of a holding device by the dynamic and the disc brake.

After being unlocked for action, the hand brake spring is re-loaded simply by releasing the hand or second friction brake by the hand lever and locked by the pedal holding device if the brake pedal is released.

This system increases the safety of operation because in the former system there is an automatic substitute for the dynamic brake but not for the automatic friction brake while in the system herein described, automatic operation of the hand brake is a possible substitute for the dynamic brake and for the automatic friction brake. The cost is considerably lowered since the disc brake need be of sufficient heat capacity to function upon fading (but not failing) of the dynamic brake and the hand brake acts on the periphery of the discs used for the magnetic disc brake thus permitting good cooling.

Another object is to provide a series of brakes, arranged to operate in sequences as above described in combination with magnetic track brakes, operation of which track brakes has a constant position in the normal sequence which depends only on the amount of travel of the foot pedal.

A further object is to provide an improved construction comprising a combination disc and hand brake in which the periphery of the disc brake is used as a frictional member of the hand brake. The hand brake thus has a substantial radius and is so located that it can be subjected to good cooling action.

Other objects and advantages will become more fully apparent as reference is had to the accompanying drawings, wherein my invention is illustrated, and in which Fig. 1 is a diagrammatic illustration of my improved braking system, Fig. 2 is a front elevation of the electrically operative friction brake, Fig. 3 is a transverse section taken along the line 3—3 of Fig. 2, Fig. 4 is a top plan view of a center bearing of a rail vehicle showing the arrangement of brakes with respect thereto, and Fig. 5 is a side elevation of the showing of Fig. 4, and Fig. 6 is a transverse section taken along the line 6—6 of Figure 2.

More particularly, 1 illustrates a brake pedal pivotally mounted at 2 on a bracket beneath the floor 3 of a vehicle which may be a street car. Pivotally attached to the end of the pedal 1 is a link 4 pivotally attached to a bell crank 5 which has a rack or gear segment 6 at its lower end. The segment 6 engages a gear 7 which rotates a shaft 8 upon which two cams 9 and 10 are mounted.

Opposing the depression of the pedal 1 is a return spring 11. This pedal carries the ground contact of a switch 12, which switch is opened by initial depressing movement of the pedal in order to break the current flow in the circuit 13. The circuit includes a solenoid composed of a coil 14, a core 15 and a battery 16 grounded at 17. Pivotally attached to the core 15 is a lever 18 fulcrumed at 19 and carrying a shoulder 20 at its outer end. When the core 15 is subject to pull by the action of the coil 14 or by one of the other coils hereinafter described it assumes the position illustrated in Fig. 1 and when not subjected to such pull the spring 21 causes it to rock about its fulcrum 19 thus depressing the end 20 thereby disengaging the stop 22 carried by the brake applying cable or rod and cable 23 and allowing the preloaded spring 72 to exert a brake applying pull on the cable.

Two additional holding devices for the lockout 20, 22 prevent the operation of the brake, as above described. First, as depression of the pedal 1 rotates the segment 6, gear 7 and cam shaft 8, a cam 9 closes a switch 24 of the dynamic brake circuit 25 which employs the motor 26 as the braking means and which includes a solenoid composed of the coil 27 and an extension of the core 15. So long as current flows in this circuit 25 the coil 27 is energized and the lever 18 will not rock to depress the shoulder 20 regardless of energization of the coil 14.

Another holding device for the lockout for the spring applied brakes is found in the electrically operated friction brake circuit which will now be described.

As the pedal 1 is depressed thus rocking the segment 6, the gear 7, cam shaft 8 and the cam 10 rotate thus closing the switch 28 at the same time. This closes a circuit 29 which includes a source of electric energy 30, a solenoid actuated disc brake 31, a speed responsive switch 32 and a solenoid in the form of a coil 33 into which the rod 15 extends as a core. Thus when current is flowing in the circuit 29 the lever 18 is held against a rocking movement which would remove the shoulder 20 from the path of the stop 22. The solenoids 27 and 33 are thus energized before the solenoid 14 loses its energization. It will be noted that the switch 28 merely conditions this disc brake for operation. Current cannot flow in the circuit 29 unless the centrifugal switch 32 is closed and this switch is set to remain open so long as the shaft 34 of the motor 26 rotates above a selected speed which I prefer to be such that the vehicle is travelling from about five to seven miles per hour. At or below the selected speed the dynamic brake fades. A resistance 35 in the circuit 29 is gradually cut back by means of a rheostat arm 36. This arm is made to rotate by further rotation of the shaft 8 which rotates the gears 37 and 38, to the latter of which the arm 36 is keyed. The friction brake 31 will be described in detail hereinafter.

Also mounted on the shaft 8 is a cam 39 which closes a switch 40 of a circuit 41 which includes a source of electrical energy 42 and track brakes 43. This circuit 41 is thus energized upon depression of the pedal 1 through a predetermined distance and without regard to the other brakes whereupon the track brakes 43 are pulled against the track 44 by magnetic attraction. The track brakes are also wholly independent of the spring applied brake. A rheostat 45 is included in the circuit for control thereof by the pedal 1. The sources of electrical energy 16, 30 and 42 may be independent batteries as shown or they may all come from one battery or generator.

Referring now to Figs. 2 and 3 the disc brake heretofore referred to generally by the numeral 31 is illustrated in greater detail.

The disc brake consists, first, of a disc 46 which is keyed to the motor shaft 34. A series of brackets 47 having inturned portions 48 extends outwardly from the casing of the motor (not shown in Fig. 3). A plate 49 carries a series of electromagnets 50 and is slidably dowelled at a plurality of points 51 to the motor casing. This plate 49 is spring pressed at a plurality of points 52 away from the bracket portions 48, the electromagnets 50 being thus held out of contact with the disc 46. The spacing between the electromagnets and the disc is adjustable by means of a series of screws 53 each of which extends through the plate 49. It will thus be seen that a flow of current in the circuit 29 energizes the electromagnets 50 thus drawing the cores or shoes 54 thereof into frictional engagement with disc 46.

The brackets 47 have extensions 55 thereon which enclose a brake band 56 about the periphery 57 of the disc 46. This band 56, as seen in Fig. 2, may be tightened against the periphery 57 by a lever 58, the lever being pivotally attached to the two ends of the band at 59 and 60. As will be seen in Figs. 4 and 5, the lever 58 is pivotally secured at its outer end to a bell crank 61 pivotally mounted at 62 to the casing of a motor 26 or other convenient truck member, and is rotatably attached at its outer end 63 to a bar 64 which extends transversely across the vehicle undercarriage or truck, generally indicated by the numeral 66, for rotatable attachment at 65 to a pushrod 67 which is pivotally attached at 68 to a bell crank 61a which, in turn, is pivotally attached to a lever 58a connected to another disc brake 31a coaxial with a second motor 26a on the same truck. The two motors are reversely placed and diagonally located on the truck 66, according to conventional rail truck practice.

Intermediate the ends 63 and 65 of the bar 64 the cable 23 is anchored at 69, and is then led through openings provided in the center bearing 70 and upwardly along the body center sill 71 for attachment to the spring 72, as shown in Fig. 1.

It will thus be seen that when the pedal 1 is depressed, the coil 14 will be de-energized, the dynamic brakes will be applied and they will decelerate the vehicle until it reaches a slow speed, say five to seven miles per hour whereupon the centrifugal switch 32 causes the disc brake 31 to function, the coil 27 loses its energization as the dynamic brake fades to a sufficiently low value.

The vehicle is thus brought to a stop and as the pedal 1 is released, the disc brake circuit 29 is de-energized thus de-energizing the coil 33 while the coil 14 is again energized thus preventing the spring 21 from lifting the core 15. If, however, during this cycle of brake application the dynamic brake fails when the centrifugal switch 32 is open and the disc brake fails, as by a short circuit, when said switch is closed, and while the brake pedal is depressed, then the three coils 14, 27 and 33 are de-energized at the same time, the spring 21 lifts the rod 15, rocks the lever 18, depresses the shoulder 20 allowing the stop 22 to pass and allowing the pre-loaded spring 72 to pull the cable 23 in order to tighten the brake band 56 around the periphery of the disc 46. Movement of the cable 23 causes the hand lever 73 to move to the position 74, and the operator must return the lever to its full line position, thus releasing the brakes and re-loading the spring 72 before he can start the vehicle.

If the operator desires to apply the hand brake he may do so at any time by moving the lever 73 from full line to dotted line position as the end 75 of the lever contacts the lever thus rocking it to move the shoulder 20 from the path of the stop 22.

The magnetic brake 43 is set for operation at any selected point of brake pedal depression and is, preferably, independent of the other brakes.

Various mechanical changes may be made without altering the normal and emergency sequences, and I, therefore, desire to be extended protection within the scope of the appended claims, in which

What I claim is:

1. In a braking system, the combination of spring applying brake means having a lockout preventing operation thereof and two holding devices for said lockout, a second braking means, a manual means, one of said devices being under control of said manual means and released upon initial movement of said manual means, said second braking means functioning to apply brakes in response to movement of said manual means, the other of said devices being subject to said second braking means and functioning to permit operation of said spring applying braking means upon failure of said second braking means.

2. In a braking system, the combination of a spring applying brake means and a second brake means, means for applying said second brake means, a lockout for said spring applied brake means having a holding device and a spring actuator controlling said holding device, said lockout preventing movement of said spring applied means, said device acting to release said lockout and acting in response to failure of said second brake means to cause said lockout to be released thereby permitting operation of said spring applying means, and a manually operable lever capable of applying the first named brakes irrespective of the setting of said lockout at the will of an operator.

3. In a braking system, the combination of spring applying brake means having a lockout preventing operation thereof and two holding devices for said lockout, a second braking means, a manual means, one of said holding devices being under control of said manual means and released upon initial movement of said manual means, said second braking means functioning to apply brakes in response to movement of said manual means, the other of said holding devices being subject to said second means and functioning to release said spring applying means upon failure of said second braking means, and a manually operable lever for restoring the potential energy in said brake applying means after an actuation thereof, said lever also being operable at the will of an operator to apply the brakes irrespective of the condition of either of said holding devices.

4. In a braking system, a spring applying brake means intended to operate as a holding brake and as an emergency brake, an electrically operative friction brake, a lockout having two holding devices restraining said spring applying means, a foot pedal which upon initial depression de-energizes one of said holding devices, said foot pedal upon further operation conditioning said friction brake for electrical operation, the other of said devices operating to release said lockout upon failure of said friction brakes to function, and means for restoring the energy potential in said spring applying means after each actuation of brakes thereby.

5. In a braking system, an electrical braking means, a service friction brake means, means causing said service brake to function with reduction of vehicle speed and consequent fading of said electrical means, a second friction brake, automatic means operable to cause application of said second friction brake upon failure of both of the other two brakes.

6. In a braking system, an electrical braking means, a service friction brake means, means causing said service brake to function with reduction of vehicle speed and consequent fading of said electrical means, a second friction brake applied by precompressed spring means, automatic means responsive to total failure of both of the other two brakes for releasing said spring means whereby said second friction brake is applied.

7. In a braking system, an electrical braking means, a service friction brake means, means causing said service brake to function with reduction of vehicle speed and consequent fading of said electrical means, a second friction brake applied by precompressed spring means, automatic means responsive to total failure of both of the other two brakes for releasing said spring means whereby said second friction brake is applied, and a manually operable lever operable to restore the spent energy in the spring of said second brake and also operable at the will of an operator to cause application of said second brake at will.

8. In a braking system, a dynamic brake, a service friction brake and a second friction brake, manual means which, upon initial actuation, causes said dynamic brake to function and conditions both of said friction brakes for operation subject to other influences, means responsive to the speed of the vehicle on which the braking system is mounted for effecting operating of said service brake, and means responsive to the total failure of said dynamic brake and said friction brake for effecting operation of said second friction brake.

9. In a braking system, a dynamic brake, a service friction brake and a second friction brake, manual means which, upon initial actuation, causes said dynamic brake to function and conditions both of said friction brakes for operation subject to other influences, means responsive to the speed of the vehicle on which the braking system is mounted for effecting operating of said service brake, said last named means also functioning to release said service brake as the vehicle approaches a stopping speed, and means responsive to the cessation of operation of said dynamic brake and said service brake for causing the application of said second friction brake.

10. In a braking system, an electrical brake, a service brake operable in response to a speed responsive means, a friction brake operative in response to failure or cessation of operation of said electrical brake and said service brake and also automatically operative as a holding brake after such failure of the dynamic brake and service brake upon release of said service when the speed of the vehicle is zero, and track brakes operative at the will of an operator irrespective of the operation of the other three brakes.

11. In a braking system, a dynamic brake, an electrical friction brake coaxial with said dynamic brake and operative upon fading of said dynamic brake in response to a speed responsive device, and a spring applied brake having a lockout with two holding devices therefor preventing operation thereof, one of said devices acting to release said lockout upon cessation of said friction brake, the other of said devices acting to release said lockout in response to cessation of said friction brake, and manual means for restoring the energy potential in said spring applied brakes after an application thereof.

12. In a braking system for a vehicle having a driving motor, manually operable means for causing said motor to function as a dynamic brake, a disc brake coaxial with the shaft of said motor comprising a braking disc and a brake drum having electromagnets associated therewith, and a centrifugal switch operative at speeds of approximately five to seven miles per hour to close a circuit for the energization of said electromagnets, said circuit thereafter having a current flow proportional to the amount of braking called for by the operator less the amount supplied by said dynamic brake.

13. A braking system for a rail vehicle comprising a dynamic brake, an electrically operative friction brake having a shaft common to said dynamic brake, and a second friction brake having pre-loaded springs for application thereof, said second friction brake comprising brake shoes applied to the periphery of said electrically operative brake, and a brake pedal, said brake pedal upon initial movement energizing said dynamic brake and conditioning the other two brakes for application, a speed responsive device for causing application of said electrically operative brake upon the speed of the vehicle falling to a predetermined amount and giving an intensification of application equal to the amount of braking called for by an operator modified by the amount of braking supplied by the dynamic brake, means responsive to the failure of the dynamic brake and of the electrically operative brake for permitting application of said friction brake, said friction brake being applicable by a manual lever at the will of an operator independent of its automatic operation and being also automatically operative as a holding brake after such failure of the dynamic brake and service brake upon release of said electrically operative brake while standing.

EMIL H. PIRON.